United States Patent [19]

Ohashi et al.

[11] Patent Number: 5,188,890
[45] Date of Patent: Feb. 23, 1993

[54] METALLIZED POROUS FLOURINATED RESIN AND PROCESS THEREFOR

[75] Inventors: Kazuhiko Ohashi; Hiroshi Kato; Takayuki Wani, all of Okayama, Japan

[73] Assignee: Japan Gore-Tex, Inc., Tokyo, Japan

[21] Appl. No.: 768,049

[22] Filed: Sep. 30, 1991

[30] Foreign Application Priority Data

Mar. 15, 1991 [JP] Japan .................................. 3-76824

[51] Int. Cl.$^5$ .............................................. B32B 3/06
[52] U.S. Cl. ............................ 428/306.6; 428/304.4; 428/421; 521/54; 521/55
[58] Field of Search .................. 428/304.4, 306.6, 421; 521/54, 55

[56] References Cited

U.S. PATENT DOCUMENTS

| | | | |
|---|---|---|---|
| 3,383,247 | 5/1968 | Adlhart et al. | 502/101 |
| 3,793,060 | 2/1974 | Weininger et al. | |
| 4,204,918 | 5/1980 | McIntyre et al. | 205/150 |
| 4,235,473 | 2/1966 | Le Duc | 205/161 |
| 4,348,429 | 9/1982 | McIntyre et al. | 427/247 |
| 4,720,400 | 1/1988 | Mannise | 427/243 |

FOREIGN PATENT DOCUMENTS 2012123  3/1970  Fed. Rep. of Germany.
1204439  9/1970  United Kingdom.

Primary Examiner—Morton Foelak
Attorney, Agent, or Firm—Gary A. Samuels

[57] ABSTRACT

A metallized porous fluorinated polymer in which at least the inside surfaces are coated with a hydrophilic fluorinated polymer and the surface of the hydrophilic polymer coated with a metal film and a process for its manufacture.

3 Claims, No Drawings

METALLIZED POROUS FLOURINATED RESIN AND PROCESS THEREFOR

FIELD OF THE INVENTION

The invention relates to metallized fluorinated polymers and processes of metallization thereof.

BACKGROUND OF THE INVENTION

Porous fluorinated polymer materials that have numerous fine pores have been known for sometime. Further, the formation of a metal film through chemical plating (nonelectrolytic plating) on the surface inside the pores in these materials is also known, as shown in Japanese patent publication 60-500905, and U.S. Pat. Nos. 3,235,473 (LeDuc), 3,383,247 (Adlhart, et al), 4,204,918 and 4,348,429 (McIntyre, et al), 4,557,957 and 4,720,400 (Manniso).

According to this known technology, materials with a metal film on the surfaces inside the resin pores are manufactured through a series of steps in which first a porous fluorinated resin material is immersed in a water-soluble surfactant solution to fill the voids in the pores of the resin with the surfactant solution. Then a step is carried out in which the surfactant solution contained in the pores is replaced with an aqueous solution of a palladium/tin activator so that palladium is deposited onto the surface inside the pores. Then the solution inside these pores is replaced with hydrochloric acid, the hydrochloric acid inside these pores is replaced with a wash bath, and finally the material that has been thus treated is immersed in a chemical plating bath and subjected to chemical plating.

In this conventional method, when the material is taken out after being immersed in the water-soluble surfactant solution, there is a great decrease in the hydrophilicity of the inside surfaces of the pores, and when the inside surfaces of the pores are dried, these pore surfaces become water repellant, thereby making it difficult to fill the pores with the aqueous solution used in the next step. Consequently, with this conventional method, the aqueous solution contained in the pores must be subjected to a liquid-liquid replacement with the aqueous solution used in the following step in order to prevent the drying of the inside surfaces of the pores and fill the pores with the aqueous solution.

However, such methods involving numerous liquid-liquid replacement operations require precise control over the time, temperature, and pressure in order to accomplish the liquid-liquid replacement, and the inconvenience of these operations is a major drawback.

The present invention solves the above problems evident in the prior art by providing a method for efficiently forming a metal film on the surface inside of the pores in a porous fluorinated polymer material, as well as the porous fluorinated polymer outside surfaces with a metal film that is obtained with this method.

SUMMARY OF THE INVENTION

The present invention comprises the discovery that when a hydrophilic polymeric coating is bonded to the inside surface of the pores of a porous fluorinated polymer material and this product is then used as the material to be plated in a chemical plating treatment, there is no need for the liquid-liquid replacement operations entailed in the above conventional methods. A metal film can be formed efficiently on the surface inside of the pores by conducting chemical plating with standard methods.

The present invention provides a porous fluorinated polymer material that has a metal film, which is characterized by the fact that in a porous fluorinated resin material that has numerous fine pores with an average pore diameter of 100 um or less, a metal film is formed over a hydrophilic polymeric film on the surfaces of the pores of said polymer.

The present invention also offers a process for manufacturing a porous fluorinated polymer that has a metal film, characterized by the fact that after first forming a hydrophilic polymeric film on the surfaces of the pores of a porous fluorinated polymer that has numerous fine pores with an average pore diameter of 100 um or less, a chemical plating treating is performed.

DESCRIPTION OF THE INVENTION

The porous fluorinated polymer used as the substrate in the present invention may be any such substance that has continuous pores with an average pore diameter of 100 microns or less. The means for forming these pores is not particularly restricted, and drawing, expansion, foaming, extraction, or other such known means may be employed. Neither are there any particular restrictions placed on the type of fluorinated resin, with the use of all types being possible. The fluorinated polymer preferred in the present invention is polytetrafluoroethylene, but in addition to this, copolymers of tetrafluoroethylene and hexafluoropropylene, polyvinyl fluoride, polyvinylidene fluoride, and the like can also be used.

The porous fluorine polymer material most preferred as the substrate in the present invention comprises drawn or expanded polytetrafluoroethylene, which has an average pore diameter of 100 microns or less, preferably, 50 microns or less, and a porosity of 15 to 95%, preferably 50 to 95%. Such a substrate is discussed in detail in Japanese Patent Publication 56-45773 and 56-17216 and U.S. Pat. No. 4,187,390.

Various types of polymers that have hydrophilic groups can be used in the present invention as the hydrophilic polymer to be bonded inside the pores of the porous fluorinated resin material. Examples of hydrophilic groups include hydroxyl groups, carboxyl groups, sulfone groups, cyano groups, pyrrolidone groups, isocyanate groups, imidazole groups, phosphoric acid groups, N-substitutable amide groups, N-substitutable amino groups, and sulfonamide groups. Also, an alkylene oxide such as ethylene oxide or propylene oxide may be subjected to an addition reaction with the active hydrogen in these hydrophilic groups.

The hydrophilic polymer may be water soluble, but if it is, it will be difficult to adequately maintain the polymer until the chemical plating process is begun once it has been bonded to the inside of the pores in the material, which can lead to the dissolving and removal of the polymer in the pre-treatment process for the chemical plating, thereby precluding the maintenance of adequate hydrophilicity on the inside surface of the pores. Consequently, the hydrophilic polymeric substance that is used whould be one that exhibits solubility with respect to water and aqueous solutions and preferably one that is essentially insoluble in water.

The hydrophilic polymer can be a polyvinyl alcohol, polyacrylic acid, polyacrylonitrile, polyvinyl sulfone, polyurethane, polyethylene oxide, starch, carboxymethyl cellulose, ethyl cellulose, sodium alginate, gluten, collagen, casein, and various other synthetic and natural polymeric substances that have hydrophilicity, but particularly from the standpoint of bondability with the fluorinated resin, the use of a hydrophilic polymer that contains fluorine is advantageous. Such a fluorine-containing hydrophilic polymer can be obtained by copolymerizing an ethylenic unsaturated monomer that contains fluorine with a vinyl monomer that contains hydrophilic groups but does not contain fluorine. Examples of fluorine-containing monomers include tetrafluoroethylene, vinyl fluoride, vinylidene fluoride, chlorotrifluoroethylene, dichlorodifluroethylene, and hexafluoropropylene. A desirable fluorine-containing monomer is the one expressed by the general formula CXY:CFZ, where Z is fluorine or hydrogen and X and Y are selected from among hydrogen, fluorine, chlorine, and trifluoromethyl ($-CF_3$). Other desirable fluorine-containing monomers are those expressed by the general formula $CH_2:CRCO_2Rf$, $CH_2:CROCORf$, $CH_2:CRORf$, $CH_2:CRCORF$, and $CH_2:CRCONHRf$, where R is hydrogen, fluorine, a methyl group, an ethyl group, a trifluoromethyl group ($CF_3$), or pentafluoroethyl ($C_2F_5$). Rf is a perfluoroalkyl group with 4–21 carbons. Preferred monomers containing hydrophilic groups are the above vinyl monomers that have hydrophilic groups, as well as monomers in which an alkylene oxide such as ethylene oxide or propylene oxide has been subjected to an addition reaction with the active hydrogen in these groups. Those that yield copolymers containing hydrophilic groups by performing first copolymerization and then hydrolysis, such as vinyl acetate, are also used.

Specific examples of these hydrophilic monomers include vinyl alcohol, acrylic acid, methacrylic acid, fumaric acid, maleic acid, itaconic acid, and other such unsaturated carboxylic acids, as well as alkylene oxide adducts of acrylic acid or methacrylic acid, such as $CH_2:CRCO_2(C_2H_4O)_mH$, $CH_2:CRCO_2(C_3H_6O)_nH$, $CH:CRCO_2(C_3H_6O)_m$ $(CF_2H_4O)_nH$, and $CH_2:CRCONH(CH_2)_3NH_2$ in which R is hydrogen or a methyl group and n and m are integers greater than or equal to one.

Both the fluorine-containing monomer and the monomer containing hydrophilic groups may be used singularly or in combinations of two or more. And if needed, other vinyl monomers, such as alkyl esters or acrylic acid or methacrylic acid, esters of trimethylolpropane or other such polyhydric alcohols and acrylic acids or methacrylic acids and the like can also be used jointly with the above fluorine-containing monomer and the monomer containing hydrophilic groups.

The copolymer of a vinyl alcohol and a fluorine-containing monomer that can be used as a desirable hydrophilic polymeric substance in the present invention can be obtained by subjecting a copolymer of vinyl acetate and a fluorine-containing monomer to saponification, and then converting the acetate groups contained in the copolymer into hydroxyl groups. In this case, not all of the acetate groups contained in the copolymer necessarily have to be converted into hydroxyl groups. Instead, the conversion of the acetate groups into hydroxyl groups may be performed to the extent that the copolymer becomes hydrophilic.

The percent fluorine in the preferred fluorine-containing hydrophilic copolymer is normally 2 to 60% by weight and preferably 10 to 60%, with 20 to 60% being most preferred. If the fluorine-containing hydrophilic copolymer contains too much fluorine, the heat resistance will be good, but the hydrophilicity of the copolymer will be diminished. On the other hand, if the fluorine content is too low, the adhesion of the fluorine-containing hydrophilic copolymer to the fluorinated polymer will be low, and its heat resistance will be poor.

In the fluorine-containing hydrophilic copolymer used preferably in the present invention, the hydrophilic group equivalent thereof is generally 45 to 700, with 60 to 500 being preferable and 60 to 450 being most preferable. When the hydrophilic group equivalent is less than 45, the solubility of the fluorine-containing hydrophilic copolymer will be extremely high, so that the copolymer will readily dissolve out of the fluorinated polymer in water and, conversely, if the hydrophilic group equivalent is greater than 700, the hydrophilicity will be so low that the objective of making the fluorinated polymer hydrophilic cannot be achieved.

Tables 1 and 2 show for several different copolymers the molar percentage of fluorine-containing monomer units in the copolymers, the fluorine weight percentage (F-wt %), and the hydrophilic group equivalent (Eq-W). VOH indicates vinyl alcohol.

The hydrophilic equivalent (Eq-W) referred to in this specification is a value obtained by dividing the molecular weight of the copolymer by the number of hydrophilic groups. The hydrophilic group equivalents given below were calculated with the equation $Eq-W = (A \cdot x + B \cdot y)/y$.

In the equation, $A \cdot x$ is a value obtained by multiplying the molecular weight of the fluorine-containing copolymer by the molar number x thereof, while $B \cdot y$ is a value obtained by multiplying the molecular weight of the copolymer containing hydrophilic groups by the molar number y thereof.

TABLE 1

| Copolymer | Molar Ratio in the Copolymer | Molar % of Fluorine-containing Monomer Units in the Copolymer | F-wt % | Eq-W |
| --- | --- | --- | --- | --- |
| $(CF_2:CF_2)_x(VOH)_y$ | x = 1, y = 40 | 2.4 | 4.2 | 56.5 |
| | 1, 30 | 3.2 | 5.5 | 46.4 |
| | 1, 20 | 4.8 | 7.9 | 48.0 |
| | 1, 10 | 9.1 | 14.3 | 53 |
| | 1, 4 | 20 | 27.5 | 68 |
| | 1, 1 | 50 | 53.1 | 143 |
| | 10, 1 | 91 | 72.8 | 1043 |
| $(CF_2:CH_2)_x(VOH)_y$ | x = 1, y = 40 | 2.4 | 2.1 | 44.6 |
| | 1, 30 | 3.2 | 2.8 | 45.2 |
| | 1, 20 | 4.8 | 4.1 | 46.2 |
| | 1, 10 | 9.1 | 7.5 | 49 |
| | 1, 4 | 20 | — | — |
| | 1, 1 | 50 | 33.6 | 107 |
| | 10, 1 | 91 | 55.6 | 683 |

TABLE 1-continued

| Copolymer | Molar Ratio in the Copolymer | Molar % of Fluorine-containing Monomer Units in the Copolymer | F-wt % | Eq-W |
|---|---|---|---|---|
| $(CFH:CH_2)_x(VOH)_y$ | x = 1, y = 40 | 2.4 | 1.1 | 44.2 |
| | 1, 30 | 3.2 | 1.4 | 45.6 |
| | 1, 20 | 4.8 | 2.1 | 45.3 |
| | 1, 10 | 9.1 | 4.0 | 47.6 |
| | 1, 4 | 20 | — | — |
| | 1, 1 | 50 | 21.3 | 89 |
| | 10, 1 | 91 | 37.8 | 503 |

TABLE 2

| Copolymer | Molar Ratio in the Copolymer | Molar % of Fluorine-containing Monomer Units in the Copolymer | F-wt % | Eq-W |
|---|---|---|---|---|
| $(CF_2:CFCL)_x(VOH)_y$ | x = 1, y = 40 | 2.4 | 3.1 | 46.0 |
| | 1, 30 | 3.2 | 4.0 | 46.9 |
| | 1, 20 | 4.8 | 5.8 | 48.9 |
| | 1, 10 | 9.1 | 10.4 | 54.6 |
| | 1, 4 | 20 | — | — |
| | 1, 1 | 50 | 35.8 | 159 |
| | 10, 1 | 91 | 47.2 | 1208 |
| $(CF_2:CCL_2)_x(VOH)_y$ | x = 1, y = 40 | 2.4 | 2.0 | 46.6 |
| | 1, 30 | 3.2 | 2.7 | 47.7 |
| | 1, 20 | 4.8 | 3.8 | 50.0 |
| | 1, 10 | 9.1 | 6.7 | 57 |
| | 1, 4 | 20 | — | — |
| | 1, 1 | 50 | 20.8 | 183 |
| | 10, 1 | 91 | 26.3 | 1442 |
| $(CF_2:CFCF_3)_x(VOH)_y$ | x = 1, y = 40 | 2.4 | 6.1 | 46.8 |
| | 1, 30 | 3.2 | 7.9 | 48.0 |
| | 1, 20 | 4.8 | 11.3 | 50.5 |
| | 1, 10 | 9.1 | 19.6 | 58 |
| | 1, 4 | 20 | — | — |
| | 1, 1 | 50 | 59.0 | 193 |
| | 10, 1 | 91 | 73.9 | 1543 |

In order to bond the hydrophilic polymer to the inside surface of the pores in the fluorinated porous polymer, the copolymer is dissolved in an alcohol, a ketone, an ester, an amide, a hydrocarbon or other such organic solvent.

The hydrophilic polymer is either immersed in this solution or the solution is sprayed on or applied with a roller to impregnate the fluorinated polymer with the solution and the solution is then dried. By so doing, the hydrophilic polymers are bonded to the inside surfaces of the fluorinated polymer, thereby permitting water to penetrate into the fine pores. The amount of hydrophilic polymer substance bonded to the fluorinated polymer should be an amount that is sufficient to enhance the hydrophilicity of the fluorinated polymer and while this amount will vary depending on the porosity of the fluorinated polymer and other factors, it is normally 1.5 to 10 wt % and preferably 2 to 6 wt % by weight of the final product.

The hydrophilic porous fluorinated polymer can also be manufactured by impregnating it with an organic solvent solution of a copolymer composed of a fluorinated monomer and a hydrophobic monomer that can be converted into hydrophilic groups (such as vinyl acetate), drying the fluorinated polymer, and then converting at least part of the acetate groups to hydrophilic groups.

The shape of the porous fluorinated polymer used in the present invention is discretionary. The material can be in the form of a film, tape, tube, yarn, fiber, fabric, rod, or rope for example.

The hydrophilic porous fluorinated polymer obtained in the above manner will have a structure in which the hydrophilic polymer substances are bonded to the inside surface of the material. This structure allows water and various aqueous solutions to penetrate and permeate into the pores. By setting the hydrophilic group equivalent of the hydrophilic polymer to within an appropriate range and controlling the solubility of the polymer with respect to water, the elution of the polymer itself from the material can be prevented. The bonding strength of the fluorine-containing hydrophilic copolymer with the porous fluorinated polymer is heightened through the action of the fluorine atoms in the copolymer, so that the durability thereof can be maintained in a stable state over extended periods of time.

In the present invention, a porous fluorinated polymer treated with the hydrophilic polymer is used as the raw material to be subjected to a chemical plating pretreatment and a chemical plating treatment. Both of these treatments can be carried out according to conventional methods.

Specifically, in the pre-treatment step, a precious metal that serves as the catalyst in the chemical plating is bonded to the inside surface of the pores onto the hydrophilic polymer. Palladium, platinum, gold, or the like can be used as this precious metal, with palladium being preferable. For the bonding of this metal, a method can be employed in which, for example, the hydrophilic treated porous polymer is first subjected to an aqueous solution of tin(II) chloride then washed with water and immersed in an aqueous solution of palladium chloride and washed again with water. When the hydrophilic polymer bonded to the porous fluorinated polymer is one that has amino groups, carboxyl groups, chlorine, or other such precious metal ion scavenging groups, a method can also be employed in which the treated polymer is first immersed in an aqueous solution containing the precious metal ions and then washed with water. These pretreatments for chemical plating are well known techniques.

The treated porous florinated polymer that has thus undergone the pre-treatment is then subjected to a chemical plating treatment by being immersed in a chemical plating bath.

The chemical plating bath will generally contain a metal, a reducing agent, a complexing agent, a buffer, a stabilizer, and the like. Here, sodium hypophosphite, sodium borohydride, aluminoborane, formalin, hydrazine, and the like can be used as the reducing agent, and formic acid, acetic acid, succinic acid, citric acid, tartaric acid, malic acid, glycine, ethylenediamine, EDTA, triethanolamine, potassium sodium tartrate, and the like can be used as the complexing agent and the buffer.

Examples of plating metals include gold, silver, platinum, rhodium, nickel, cobalt, tungsten, copper, zinc, iron, and various other metals, as well as alloys of these. To obtain an alloy metal film, metal salts with a composition that corresponds to the desired metal film should be used as the metal salts added to the plating bath.

In order to form a metal film of platinum or gold or an alloy thereof, or other metal film that is difficult to form through chemical plating on the hydrophilic polymer used in the present invention, a metal film which can be easily formed through chemical plating, such as cobalt, nickel, or copper, is first formed on the hydrophilic polymer, and this polymer then subjected to a chemical plating treatment or electroplating treatment.

When chemical plating is used to form a metal film compound of platinum or an alloy containing platinum on the hydrophilic polymer used in the present invention, the chemical plating treatment can be facilitated through the use of hydrazine hydrochloride as the reducing agent. Since the reduction of the platinum ions in a chemical plating bath that contains platinum ions occurs readily, it is difficult to selectively deposit the platinum on only the object being plated, but when hydrazine hydrochloride is used as the reducing agent, there is a marked increase in the stability of the plating bath, thereby allowing the platinum to be selectively deposited on only the object being plated. Further, when hydrazine hydrochloride is used as the reducing agent, a metal film of a platinum alloy, such as platinum-iridium or platinum-rhodium, can be easily obtained.

A composite plating method can also be employed for the chemical plating method used in the present invention. This composite plating method is one in which a metal film is formed that contains a micropowder of an oxide, nitride, or carbide of a metal, for example, and the plating bath is one in which this micropowder has been uniformly dispersed.

In the present invention, since a porous fluorinated polymer to which a hydrophilic polymer has been bonded is used as the raw material to be plated, a metal film can be easily formed on the inside surface of the pores of this material through chemical plating. Naturally, in the present invention, the metal film can be formed not only on the inside surface of the pores, but also over the entire surface of the material. For instance, with a sheet material, the metal film can be formed inside the pores and on one side of the sheet, or inside the pores and on both sides of the sheet. For those portions of the material surface on which no metal film formation is desired, a plastic material, such as a polytetrafluoroethylene film or other plastic film, can be used to cover those portions prior to the chemical plating, and this plastic film is then peeled off after the chemical plating. The thickness of the metal film formed in the chemical plating is normally approximately 10 A to 1 um and in particular 500 A to 4000 A.

With the present invention, the metallized polymer film that has been obtained in the above manner can also be subjected to further chemical plating or electroplating and a porous metal film can be formed on the surfaces thereof.

The metallized porous fluorinated polymer of the present invention is characterized in that it has a metal film (is metallized) on at least the inside surface of the pores thereof and this metal film is bonded to the polymer via the hydrophilic polymer. When the porous fluorinated polymer is one that has a fine structure that includes knodes in which fibers are bonded together, such as the one described in Japanese Patent Publication 56-17216, the metal film essentially encloses these knodes and fibers.

With the present invention, the thickness of the fluorinated polymer can be suitably controlled using a method in which the porous fluorinated polymer is coated with the hydrophilic polymer, a method in which the porous fluorinated polymer is impregnated with various types of aqueous solutions, or a similar method. Examples of this finished product include; a sheet that is conductive along the sheet thickness direction and one or both surfaces of the sheet; a sheet that is conductive only on both surfaces of the sheet; a sheet that is conductive only on one surface of the sheet; a tube that is conductive along the tube thickness direction and one or both surfaces of the tube; a tube that is conductive only on both surfaces of the tube; and a tube that is conductive only on one surface of the tube.

The present invention can provide a metallized porous fluorinated polymer that has a platinum film. Because of its fine porosity, this material has a large specific surface area, so that it can be used as a platinum electrode with a large reaction surface area. Furthermore, since such a platinum electrode is pliant and tough, the electrode can be formed into different shapes at will, thereby allowing the electrolysis tank to be made more compact. And this electrode has the advantage that only a small amount of expensive platinum is used. In addition, by combining this electrode with solid electrolysis, smaller electric cells, capacitors, and other such chemical elements can be obtained.

The present invention can provide a highly efficient gas diffusion electrode by laminating a porous fluorinated polymer sheet over metallized polymer sheet that has a platinum film. Gas diffusion electrodes are generally porous electrodes in which one side is in contact with electrolyte and the other side is in contact with a reaction gas. On the inside of the gas diffusion electrode is formed a three-phase interface of the electrode, the reaction gas, and the electrolyte. In addition to chemical resistance and corrosion resistance, gas diffusion electrodes must also have a function that prevents the leakage of electrolyte on the reaction gas side and the bubbling of the reaction gas to the electrolyte side.

By positioning the side of the metallized polymer that has the platinum film on the electrolyte side and the porous fluorinated polymer sheet that is not metallized on the reaction gas side, the laminate of the present invention, composed of the metallized polymer that has a platinum film and the porous fluorinated polymer sheet, can serve as an ideal gas diffusion electrode, which was unattainable by prior at methods.

The present invention also offers a laminate that is generally composed of metallized polymer that has a platinum film and a porous fluorinated polymer sheet. In addition to being used as a gas diffusion electrode as mentioned above, since such a laminate is conductive and has excellent hydrophilicity on one side and is insulating and has excellent hydrophobicity on the other side, it can also be used in a wide variety of fields in which it characteristics can be utilized.

Because the metallized polymer of the present invention is hydrophilic and conductive, it can be used to advantage as a conductive filtration membrane, a sensor membrane, an electromagnetic shield, a catalyst material, a conductive clothing material, a flexible printed substrate or an antenna material.

The metallized polymer of the present invention can be used in many different shapes, such as sheet, tube, wire, cable, rod, yarn, fiber, fabric or a cylinder.

EXAMPLES

The present invention will now be described in further detail by giving practical examples.

Experimental Procedure

Thickness

The thickness was measured with a dial thickness gauge with a precision of 1/1000 mm.

Ethanol Bubble Point (EBP)

Ethanol was spread over the surface of the material (film) sample, the sample placed horizontally on a fixing apparatus, and the EBP measured. Here, air was blown from below the sample. The EBP is the initial pressure ($kg/cm^2$) at the point air bubbles are continuously exiting from the surface on the reaction side. The average pore diameter can be calculated from the EBP by a method such as ASTM-F316-80, wherein the pore size is obtained by an instrument, Model No. "PORO" (Cutler Electronics Ltd.). The pore size distribution curve for a sample sheet is automatically obtained by the instrument. The integrated curve is divided by 2 to obtain the average pore diameter.

Porosity

The porosity of the polymer film prior to impregnation was obtained by measuring the density of the material. The density of the material (polytetrafluoroethylene) was 2.2 $g/cm^3$. The porosity was calculated using the equation:

$$Porosity = (2.2 - \text{sample density}) \div 2.2 \times 100$$

In the calculation of the porosity after impregnation, a density of 2.1 $g/cm^3$ was used in place of the 2.2 $g/cm^3$.

Flow Time

The flow time is the amount of time required for 200 ml of water to pass through a sample with a diameter of 35 mm under a vacuum of one atmosphere. The sample was fixed horizontally and water was poured over it. A vacuum was then applied from below. When measuring a sample before impregnation, the sample was first impregnated with ethanol to make the material hydrophilic.

Durability

The durability of the material after the impregnation treatment is an indication of its hydrophilicity after undergoing five Flow Time tests and being dried after each test, or after ten liters of water had passed through using a flow test machine and method.

Fluorine and Hydroxyl Group Content

The fluorine content and the hydroxyl group content were determined through calculation.

Water Permeability (WP)

The WP was determined with the equation:

$$WP = 200 - (\text{flow time} - 60 \times (1.75)^2 \times 3.14)$$

Heat Resistance

The heat resistance was determined by fixing the film in a frame, leaving the film in an air oven controlled to the test temperature, and then measuring the hydrophilicity in the manner given below.

Gurley Number (GN)

The GN was determined by measuring the amount of time required for 100 cubic centimeters of air to pass through a sample with a surface area of 6.45 $cm^3$ under a water pressure of 12.4 cm.

Acid, Alkali, and Solvent Resistance

The sample was immersed in a solution for the length of time given in the practical examples, then, after drying, its hydrophilicity was measured in the manner given below.

Hydrophilicity

The initial hydrophilicity was determined by dropping a drop of water onto the sample from a height of 5 cm, then measuring the time needed for the water drop to be absorbed. The hydrophilicity was evaluated in the following manner:

A. absorbed in one second or less;
B. absorbed eventually;
C. absorbed only under pressure;
D. no absorption, but reduction in the water drop contact angle; and
E. no absorption, that is the water was repelled (this E evaluation is characteristic of porous fluorine resin material)

REFERENCE EXAMPLE 1

A copolymer of tetrafluoroethylene and a vinyl alcohol (a saponified copolymer of tetrafluoroethylene and a vinyl acetate (degree of saponification of 100%, fluorine content 27 wt. %, hydroxyl group content 14.5 mmol/g) was dissolved in one liter of methanol to prepare a 0.2 wt. % methanol solution. A porous fluorinated resin film with a thickness of 40 microns and a porosity of 80% was immersed in and impregnated with this methanol solution, fixed in a frame, and dried at 60° C. for five minutes. This same process was repeated five times to obtain a hydrophilic porous film whose hydrophilicity received an A rating and whose flow time was 60 seconds. The thickness of this film was 30 microns, its porosity was 70%, its EBP was 1.2 kg/sq. cm., its calculated pore diameter was 0.2 microns, and its WP was 20 $cm^3/cm^2$/minute. This good hydrophilicity was still evident after 24 hours at a heat resistance temperature of 120° C., but the hydrophilicity was lost at 135° C.

Upon immersing this film in water, no elution of the hydrophilic copolymer into the water occurred. Neither was any change observed upon immersion in boiling water. This film exhibited a high level of acid resistance with respect to 12N hydrochloric acid at room temperature and 1N hydrocholoric acid at 80° C., and to other such acids, and also exhibited a high level of alkali resistance with respect to 5N sodium hydroxide at room temperature and 1N sodium hydroxide at 80° C., and to other such alkalies.

REFERENCE EXAMPLE 2

A copolymer of tetrafluoroethylene and vinyl acetate was dissolved in methyl ethyl ketone to prepare a 0.5 wt % solution. A porous polytetrafluoroethylene film with a thickness of 40 um and a porosity of 80% was impregnated with this solution, fixed in a frame, and dried at 60° C. for five minutes. This same process was repeated five times. The film thus obtained was saponified by immersing it in ethanol containing sodium methoxide and then heat treating it for 30 minutes. This saponified hydrophilic film was then washed with water. This film displayed the same characteristics as the film in Reference Example 1.

REFERENCE COMPARATIVE EXAMPLE 1

A porous, expanded polytetrafluoroethylene film with a thickness of 40 um and a porosity of 80% was impregnated for 20 minutes with a 5 wt % isopropanol solution of an anionic surfactant (ammonium perfluoroalkyl sulfonate) (FC-93, made by 3M) that served as a surfactant and was then dried at room temperature to produce a hydrophilic film. This film had poor stability and its hydrophilicity was lost after 200 ml of water had been passed through the film five times.

REFERENCE EXAMPLE 3

A porous polytetrafluoroethylene, with a thickness of 48 um, a GN of 6.1 seconds, an EBP of 1.15 kg/cm$^2$, a porosity of 76%, and a flow time of 36 seconds, was immersed for 30 seconds in a 1% solution of the copolymer used in Reference Example 1, after which the film was taken out, fixed in a frame, and dried at room temperature for one hour. The properties of the film thus obtained were as follows: copolymer content in the film 0.75 kg/m$^2$, film thickness 39 um; GN 10.4 seconds; EBP 1.2 kg/cm$^2$; porosity 71%; flow time 56 seconds; WP speed 20 cm$^3$/m$^2$/minute.

Hydrophilicity and durability tests were performed after either passing 200 ml of water through an impregnated film (drying after each time) (Method 1) or passing 10 l. of water through continuously (Method 2). The results were as follows:

| Durability Test Conditions | Hydrophilicity Test Results |
| --- | --- |
| Method 1 | A |
| Method 2 | A |

An impregnated film was subjected to a five-time flow time test. Drying was performed after each test. Upon then subjecting this film to a hydrophilicity test, it had an A rating. For another impregnated film a flow time test machine and test method were used to pass 10 l. of water through the film continuously. The hydrophilicity test result for this film had an A rating.

To determine the heat resistance, an impregnated film was first subjected to a heat treatment at the temperature and for the durations given below and then to a hydrophilicity test, whereupon the following results were obtained:

| Temperature | Duration | Hydrophilicity Test Results |
| --- | --- | --- |
| 100° C. | 30 hours | A |
| 120° C. | 6 hours | B (absorption after 60 sec.) |
| 120° C. | 24 hours | B (absorption after 60 sec.) |
| 120° C. | 48 hours | B (absorption after 120 sec.) |
| 150° C. | 2 hours | C or D |
| 150° C. | 24 hours | D |
| 200° C. | 1 hour | D |

Another sample of the impregnated membrane was immersed under the following oxidative conditions for the following times and the hydrophilicity test was then carried out with the following results:

| Oxidative Agent | Temperature | Time | Hydrophilicity Test Results |
| --- | --- | --- | --- |
| 2N—HNO$_3$ | 85° C. | 2 hr. | A |
| 3N—HNO$_3$ | R.T. | 350 hr. | A |

Hydrophilicity after immersion for 350 hours in 3N—HNO$_3$ at room temperature was A.

Hydrophilicity after immersion for 2 hours in 2N—HNO$_3$ at −85° C. was A.

To determine oxidiation resistance, after immersing an impregnated film under the oxidation conditions shown below for the durations shown below, a hydrophilicity test was conducted which gave the following results:

| Oxidant | Temperature | Duration | Hydrophilicity Test Results |
| --- | --- | --- | --- |
| 1 N hydrochloric acid | 80° C. | 2 hours | A |
| 3 N nitric acid | room temperature | 350 hours | A - |
| 12 N nitric acid | room temperature | 1 hour | A |

After immersing an impregnated film under the alkaline conditions shown below for the durations shown below, a hydrophilicity test was conducted which gave the following results:

| Alkali | Temperature | Duration | Hydrophilicity Test Results |
| --- | --- | --- | --- |
| 1 N sodium hydroxide | 80° C. | 2 hours | A |
| 1 N sodium hydroxide | 80° C. | 5 hours | D |
| 6 N sodium hydroxide | room temperature | 36 hours | A |

After passing the solvents shown below through an impregnated film, a hydrophilicity test was conducted to obtain the following results.

| Solvent | Flow-through Amount | Hydrophilicity Test Results |
| --- | --- | --- |
| Methanol | 300 ml | A |
| Ethanol | 2000 ml | A |
| Acetone | 5000 ml | A |

Even though methanol is a good solvent of the copolymer, the hydrophilicity rating was A after 300 ml of methanol had been passed through the film. Ethanol and acetone are not good solvents of the above-mentioned copolymer.

PRACTICAL EXAMPLE 1

A porous fluorinated polymer film (a circle of polytetrafluoroethylene film with a diameter of 50 mm) that had a thickness of 40 microns, a porosity of 80%, and a pore diameter of 0.2 microns, was degreased and cleaned by immersing it in acetone for five minutes.

Two weight parts of a copolymer of tetrafluoroethylene and a vinyl alcohol (a saponified copolymer of tetrafluoroethylene and vinyl acetate, with a degree of saponification of 100%, a fluorine content of 27 wt %, and a hydroxl group content of 14.5 mmol/g) was dissolved in one liter of methyl alcohol.

This solution was used to impregnate the above film that had been degreased and cleaned and, after drying for five minutes at 60° C., the film was immersed in water.

The film was then immersed for two minutes at room temperature in an aqueous solution of tin(II) chloride ($SnCl_4$) that had been made acidic with hydrochloric acid, thereby causing the tin ions to be adsorbed onto the surface of the film and the film was washed with water. This film was then immersed for two minutes at room temperature in a acidic aqueous solution of palladium chloride ($PdCl_5$) to bring about the precipitation of a small amount of palladium on the surface of the film and the film was washed with water.

After this, the film was immersed for one minute in an organic electrolytic nickel plating bath (Ni-201, made by Kojundo Kagaku Kenkyusho) that was maintained at 80° C. and the porous fluorine resin film was plated with nickel. The thickness of the plating that surrounded the knots and fibers at this point was approximately 100 Å.

PRACTICAL EXAMPLE 2

A porous fluorinated polymer film (a circle of polytetrafluoroethylene film) with a diameter of 50 mm that had a thickness of 40 microns, a porosity of 80%, and a pore diameter of 0.2 microns) was degreased and cleaned by immersing it in acetone for five minutes.

Two weight parts of a copolymer of tetrafluoroethylene and a vinyl alcohol (a saponified copolymer of tetrafluoroethylene and vinyl acetate, with a degree of saponification of 100%, a fluorine content of 27 wt %, and a hydroxyl group content of 14.5 mmol/g) was dissolved in one liter of methyl alcohol. This solution was used to impregnate the above film that had been degreased and cleaned, and after drying for five minutes at 80° C., the film was immersed in water.

This film was then immersed for two minutes at room temperature in an aqueous solution of tin(II) chloride ($SnCl_4$) that had been made acidic with hydrochloric acid, thereby causing $Sn^2$ to be adsorbed onto the surface of the film and the film was washed with water. This film was then immersed for two minutes at room temperature in an acidic aqueous solution of palladium chloride ($PdCl_4$) to bring about the precipitation of a small amount of palladium on the surface of the film and the film was washed with water.

This film was then plated with platinum by immersing it for 120 minutes at 40° C. in a plating bath for which 0.26 g of chloroplatinic acid hexahydrate had been added to 100 ml of an aqueous solution in which 0.9 g of hydrazine hydrochloride had been dissolved. The thickness of the plating that surrounded the knots and fibers at this point was approximately 1000 Å and the mount of precipitation was 2 $mg/cm^2$.

PRACTICAL EXAMPLE 3

The nickel-plated, fine, porous polytetrafluoroethylene material obtained in Practical Example 1 was immersed for 30 minutes in a non-electrolytic gold plating bath (K-24N, made by Kojundo Kagaku Kenkyusho) maintained at 85° C., thereby gold plating the nickel-plated, fine, porous polytetrafluoroethylene material. The thickness of the plating that surrounded the knots and fibers at this point was approximately 3000 Å, and therefore, the total thickness of the nickel plating and the gold plating was approximately 4000 Å.

We claim:
1. A metallized fluorinated polymer comprising:
    (a) porous fluorinated polymer having an average pore diameter of 100 microns or less;
    (b) a hydrophilic polymer film, comprising a copolymer of a fluorinated monomer and a monomer containing hydrophilic groups, coated on at least the inside pore surface of said fluorinated polymer; and
    (c) at least one layer of metal film coating the hydrophilic polymer film surfaces inside said pores of said porous fluorinated polymer.
2. A polymer of claim 1 wherein said fluorinated polymer comprises porous expanded polytetrafluoroethylene.
3. A polymer of claims 1 or 2 wherein said metal film comprises a multi-layer metal film.

* * * * *